Patented May 5, 1936

2,039,514

UNITED STATES PATENT OFFICE 2,039,514

METHOD OF PREPARATION OF THE ETHER HYDROCHLORIDES OF PSEUDOUREA

Martin Battegay, Mulhouse, France, assignor to The Calco Chemical Company, Inc., Bound Brook, N. J., a corporation of Delaware No Drawing. Application July 28, 1932, Serial No. 625,535. In France August 3, 1931

2 Claims. (Cl. 260—125)

The present invention constitutes a method of preparation of the ethers of pseudourea under the form of their hydrochlorides, a method which allows a notable addition to the corresponding aryl ethers, the synthesis of which has been tried, without success, by different authors.

It is suitable to note Praetorius and Seidler (Jour. f. prakt. Chem. (2) vol. 21, pg. 137, v. Beilstein 1921, vol. 3, pg. 77) who submitted phenol, in the presence of absolute alcohol, to the action of cyanamide, but where this latter was transformed only to the dicyandiamide, then Arndt (Liebig's Ann., vol. 384 (1911) pg. 349) who, consecutively with a study on the aryl ethers of pseudothiourea, tried in vain to obtain derivatives of pseudourea inspired by the technic, thought of by Stieglitz and McKee (D. Chem. Ges., vol. 33 (1900) pg. 1517–1519), who ended with the corresponding alkyl ethers. Arndt declares formally, on this occasion, that he had not succeeded, in any way, in making phenol react with cyanamide, neither under the conditions for the preparation of aryl ethers of thiopseudourea, nor under those where hydrochloric acid intervenes in different solvents. Let me mention finally the failure recorded by W. F. Short and J. Ch. Smith (J. Chem. Soc., vol. 121 (1922) pg. 1804) apropos of their study of the condensation of phenols with hydrochlorates of cyanamide and of carbodiamide, and where these authors submitted phenate to the action of an equimolecular mixture of cyanamide and cyanamide dihydrochloride ($CN_2H_2+CN_2H_2.2HCl$) obtaining only the unaltered phenol beside the dicyandiamide.

As regards the equimolecular mixture of cyanamide and its dihydrochloride which lead to the so-called cyanamide monohydrochloride, which has been commended likewise by Stieglitz and McKee (D. Chem. Ges., vol. 38 (1903) pg. 2243) for the improved preparation of the alkyl ethers of pseudourea, it is fitting to remark that it is a question of an unstable reagent. This "monohydrochloride" already deteriorates, and even more rapidly than the free cyanamide, at room temperature. There is formed, at the end, products still soluble in water, which in contrast with unchanged cyanamide precipitate with picric acid, giving yellow picrates slightly soluble. The more advanced change, which is accelerated considerably by raising the temperature to 60–70°, leads to products insoluble in water.

The use of cyanamide or its "monohydrochloride" can, consequently, only be allowed in the case where the ether of pseudourea forms at a low temperature.

The crystallized dihydrochloride of cyanamide being, on the contrary, perfectly stable at high temperatures, since it is only around 130° and then at a prolonged heating at this temperature that decomposition starts, its use would be suitable for transforming into pseudourea, those hydroxyl compounds which, for example phenols and their derivatives, react with cyanamide only at raised temperatures, higher than the point of change of the latter.

These facts established, the method of preparation of the ethers of pseudourea in the form of hydrochloride, consists in working away from all humidity, mixing intimately cyanamide dihydrochloride ($CN_2H_2.2HCl$) with a compound with a hydroxyl function, eventually diluted either by an excess of this latter, or by an indifferent organic solvent, and then proceeding with thorough stirring to heating, raising the temperature rapidly to 70°. It is then raised gradually so as to reach in three or four hours the maximum temperature which hardly goes beyond 140–150° and which depends essentially on the point of decomposition of pseudourea hydrochloride formed. The end of the reaction coincides generally with that of the liberation of the hydrochloric acid freed in the reaction. In certain cases, it is advantageous to have, during the time of the reaction, a moderate current of dry hydrogen chloride gas pass through, and the end of the operation is recognized then by determining in a sample first diluted or spent distilled water, by means of silver nitrate, the complete disappearance of the cyanamide.

One could start also with the free cyanamide that is mixed, at room temperature, with a compound having a hydroxyl function, eventually diluted, either with an excess of the latter or by an indifferent organic solvent, so as to form a fluid and homogeneous mass. This is then treated, in the cold and with thorough stirring, with dry hydrogen chloride gas until complete saturation, which corresponds to the transformation of the cyanamide into the dihydrochloride. Starting with this moment, the hydrogen chloride gas, which, the case occurring, can be continued to be introduced, escapes and it is only then that heating takes place, under the conditions already mentioned.

The product of the finished reaction is extracted after cooling, by water in which the ether hydrochloride of pseudourea is readily soluble. In concentrating the filtered extract, the act occurring under vacuum, there remains, after cooling, the crystallized hydrochloride.

The ether hydrochlorides of pseudourea obtained by following the present invention should be of use in the manufacture of dyestuffs and of intermediates for their production.

We should mention, for example, in this respect that betanaphthol transformed into the beta-naphthyl ether hydrochloride of pseudourea, acquires the valuable property of becoming perfectly soluble in water, either neutral or acid. As on the other hand, under these conditions the reactivity of beta naphthol is hindered as a result of the etherification of the hydroxyl function, the aqueous solution of beta naphthyl ether can be added, for example, to the diazonium salts of paranitraniline, of sulfanilic acid or other similar substances, without any reaction, that is to say, coupling. This latter is instantaneous as soon as an alkali is added which splits the naphthyl ether.

*Example 1*

9.5 parts of cyanamide are dissolved in 50 parts of phenol at room temperature, then, at this same temperature, dry hydrogen chloride gas is run in which starts the precipitation of cyanamide dihydrochloride as a powder. As soon as the hydrogen chloride gas begins to escape from the liquor, the latter is raised to 100°, taking care to stir well for two hours, while a weak current of hydrogen chloride gas continues to bubble in and the reaction product is well stirred, the temperature is gradually raised until, at the end of an hour, it reaches 140°. The temperature is finally maintained, for a half hour at 150°.

The free cyanamide in the starting materials can be replaced by the equivalent quantity (25 parts) of cyanamide dihydrochloride previously prepared, for example, by the directions of Drechsel (Journ. pr. Chem. (2) vol. II, pg. 235). In this case, the current of hydrogen chloride gas may be omitted. It is enough to heat, at the indicated temperatures, until the evolution of the hydrogen chloride gas liberated in the reaction, has finished.

The end product, after cooling, is a brown oily mass which, freed from unchanged phenol, either by distillation under vacuum, or by extraction with benzene or ether, constitutes a light brownish powder which is almost entirely soluble in cold water. This aqueous solution is filtered and dried under a vacuum. On cooling, a brown product, already relatively pure, is obtained. Purification for analysis can be carried out either by solution in alcohol and precipitation with ether or by crystallization in a mixture of alcohol and ether. The yield of phenylether hydrochloride of pseudourea is 65%. It is white platelets which pack at 165° and melt sharply at 200°. The product carried to 225° in fusing, leaves the foamy state and becomes again a solid mass which does not melt at 300°.

The product has most probably the following structural formula:

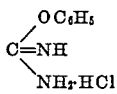

Sample, 4.403 mg. N₂; V=0.638 cc.; T=20°; P=747 mm., or 16.59% N and calculated for C₇H₉ON₂Cl, 16.2% N.

The picrate of this pseudourea is easily formed by the addition of a picric acid solution to that of the hydrochloride. It is slightly soluble in water and forms, after recrystallization in alcohol, yellow needles which melt at 233–234°.

Nitrogen determination:
Sample, 5.267 mg.; V=0.900 cc. N₂; T=17°; P=730, or 19.37% N, calculated for C₁₃H₁₁O₅N₅: 19.18% N.

*Example 2*

15 parts of cyanamide are introduced into 75 parts of metacresol and heated gradually, raising the temperature, with thorough stirring, with or without the continuous introduction of a weak current of dry hydrogen chloride gas, to 140° at the end of an hour. This temperature is maintained for about three hours before raising it for the fourth and last hour to 150–155°.

The cyanamide hydrochloride can be replaced by the equivalent quantity of cyanamide. This is dissolved at room temperature in cresol, then submitted at the same temperature, to a stream of dry hydrogen chloride gas until complete saturation. It is only then that one proceeds under the indicated conditions to a gradual raising of the temperature. The reaction product is, after cooling, a brown, viscous liquid which holds, in suspension, a small amount of an insoluble white precipitate (0.5 parts) that can be separated by filtration. The filtrate is extracted, several times, with cold water which takes up the greater part of the pseudourea hydrochloride formed. After taking it all up, the unchanged and decanted cresol is carried off by steam distillation and the aqueous residue of the extract combined. This is concentrated on a water bath until the appearance of the first crystals. The aqueous liquid thus reduced, solidifies in the cold, to a white crystalline mass which dried, shows a yield of 78–80% metatoluylether hydrochloride of pseudourea. They are easily recrystallized in either alcohol or water. They melt at 215–216° undergoing previously at 195° a packing and a softening at 205°. The product in fusion carried to 220° decomposes with heavy foaming and becomes solid again between 230 and 235°.

The product has most probably the following structural formula:

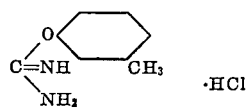 ·HCl

Determination of nitrogen:
Sample=4.489 mg.; V=0.593 cc. N₂; T=17°; P=742 mm., or 15.18% N₂, calculated for C₈H₁₁ON₂Cl: 15.06% N.

Determination of chlorine:
Sample=12.265 mg.; AgCl=9.750 mg. or 19.33% Cl, calculated for C₉H₁₀ON₂Cl: 19.01% Cl.

The hydrochloride is easily transformed into a slightly soluble picrate, which is precipitated from an aqueous solution by the addition of a saturated solution of picric acid. Recrystallized from alcohol, it forms beautiful yellow needles melting at 243–244° with decomposition.

Determination of nitrogen:
Sample=5.653 mg.; V=0.935 cc.; T=18°; P=731 mm., or 18.66% N; calculated for C₁₄H₁₃O₈N₅=18.47% N.

*Example 3*

The work is carried out exactly as in Example 2, substituting for the metacresol the same quantity of orthocresol. The yield is 60% orthotoluyl ether hydrochloride of pseudourea, which melts at 208° after undergoing a packing at 200°. Its picrate melts at 232–233°.

The product has most probably the following structural formula:

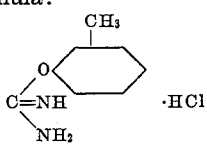

Determination of nitrogen in the hydrochloride:
Sample=5.433 mg.; V=0.747 cc.; T=25°; P=747 mm., or 15.38% N; calculated for $C_8H_{11}ON_2Cl = 15.06\%$ N.

Determination of nitrogen in the picrate:
Sample=4.859 mg.; V=0.819 cc.; T=21°; P=734 mm., or 18.90 N; calculated for $C_{14}H_{13}O_8N_5 = 18.47\%$.

*Example 4*

50 parts of beta naphthol, 10 parts of cyanamide dihydrochloride and 20 parts of nitrobenzene are intimately mixed, then heated to 120° when the whole mass fuses and becomes clear. It is well stirred, and it can be carried, either as it is, or in a continuous current of dry hydrogen chloride gas, for about three hours from 130° to 140°, then, after the complete disappearance of the cyanamide, to 150°. The reaction product, when chilled, becomes a solid mass. This treated with 100 parts of benzene or of ether reliquefies to a large extent. It is extracted, in this state, with cold water until the complete exhaustion of the pseudourea hydrochloride formed. This separates from aqueous extracts, the volume of which is reduced by evaporation until when cool, it crystallizes.

There is about a 60% yield of beta naphthyl ether hydrochloride of pseudourea which is in the form of light rose crystals which can be purified by recrystallization from water. It melts at 210°, packing first at 198°. The picrate, which is composed of yellow prisms, melts at 228°.

The product has most probably the following structural formula:

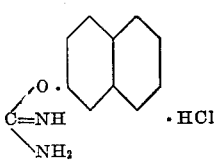

Determination of nitrogen in the hydrochloride:
Sample=4.907 mg.; V=0.547 cc.; T=27°; P=740 mm., or 12.45% N; calculated for $$C_{11}H_{11}ON_2Cl = 12.61\% \text{ N}.$$

Determination of nitrogen in the picrate:
Sample=5.779 mg.; V=0.903 cc.; T=29°; P=740 mm., or 17.19% N; calculated for $C_{17}H_{13}O_8N_5 = 16.87\%$ N.

*Example 5*

The work is carried out exactly as in Example 4, the case occurring, without adding nitrobenzene, in substituting for beta naphthol the same amount of alpha naphthol. The separation of the pseudourea hydrochloride is brought about preferably in the form of double salts such as the chlorozincates, the chlorostannates or others. On adding, for example, 15 parts of tin tetrachloride diluted with the same amount of concentrated hydrochloric acid, the chlorostannate separates as light brownish crystals. It can be purified by recrystallization in dilute hydrochloric acid.

The product has most probably the following structural formula:

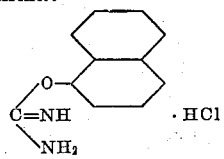

Determination of nitrogen:
Sample=10.797 mg.; V=0.791 cc. $N_2$; T=23°; P=745 mm., or 8.28% N; calculated for $$C_{22}H_{22}O_2N_4SnCl_6 = 7.95\% \text{ N}.$$

The picrate melts at 204–205°.
Determination of nitrogen:
Sample=5.204 mg.; V=0.768 cc. $N_2$; T=22°; P=750 mm., or 16.84% N; calculated for
$C_{17}H_{13}O_8N_5 = 16.87\%$ N.

*Example 6*

This concerns the resorcin derivatives which are two in number, depending on whether an excess of resorcin is used or an amount corresponding to two equivalents of cyanamide. In working, under the conditions of Example 5, with an intimate mixture of 30 parts of resorcin and 10 parts of cyanamide dihydrochloride, there is formed, after cooling, a carmine-red viscous mass which, treated with 200 parts of water slightly acidulated with hydrochloric acid, goes completely into solution. The red-brown liquor which results, is freed from the unchanged resorcin by ether extractions, then concentrated by evaporation. As soon as a sample of crystals separates on cooling, the concentration is stopped and the liquor left to itself. It then assumes a brownish crystalline mass that is dried. These crystals represent a yield of 62% of the crude meta-hydroxyphenylether hydrochloride of pseudourea. Treatment with animal black and recrystallization in dilute hydrochloric acid gives pure white needles which melt at 218–220°, previously packing at 215° and becoming solid again at 270°.

The product has most probably the following structural formula:

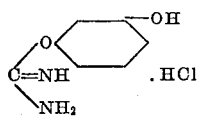

Determination of nitrogen:
Sample=7.330 mg.; V=0.944 cc. $N_2$; T=20°; P=744 mm., or 14.64% N; calculated for $$C_7H_9O_2N_2Cl = 14.81\% \text{ N}.$$

The picrate is readily soluble in warm alcohol, less soluble in water, from which it can be advantageously recrystallized. It is then in the form of golden yellow platelets which melt around 230–250° and decompose between 255–261°, foaming heavily at 262°.
Determination of nitrogen:
Sample=4.326 mg.; V=0.711 cc. $N_2$; T=22°; P=743 mm., or 18.59%; calculated for $$C_{13}H_{11}O_9N_5 = 18.37\% \text{ N}.$$

*Example 7*

9.5 parts of cyanamide are dissolved in 80 parts of cyclohexanol at room temperature and a current of dry hydrogen chloride gas introduced. As soon as the latter begins to escape from the liquid, which has been well stirred, the temperature is raised to 70°, then carried higher gradually, while continuing the introduction of a weak current of hydrogen chloride gas, until at the end of three to four hours, it has reached 120°.

The product has most probably the following structural formula:

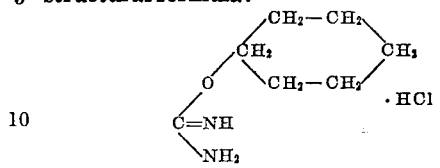

The free cyanamide in the starting materials can be replaced by the equivalent amount of crystallized cyanamide hydrochloride (25 parts), heating in this case without introduction of the hydrogenchloride gas, to the indicated temperatures until the evolution of the hydrochloric acid freed in the reaction, has stopped.

We end thus, after cooling, with a brown oily mass from which the unchanged cyclohexanol can be removed by steam distillation. The aqueous residue of this distillation is filtered from a small amount of insoluble precipitate and the filtrate concentrated by evaporation. It then becomes a yellowish brown crystalline mass which, dried, shows a crude yield of 68–70% cyclohexanolpseudourea hydrochloride.

The same yield can be obtained also by exhausting in cold water the reaction product and by concentrating the aqueous extracts thus obtained. The product purified by recrystallization melts at 175°, foaming strongly and retaking a solid form.

Determination of nitrogen:
Sample=5.198 mg.; V=0.713 cc.; T=17°; P=741 mm. or 15.74% N; calculated for $C_7H_5ON_2Cl$=15.64% N.

Determination of chlorine:
Sample=0.2820 g.; AgCl=0.2278 g., or 19.98% Cl.; calculated for $C_7H_5ON_2Cl$=19.9% Cl.

The picrate melts at 161–163°.
Determination of nitrogen:
Sample=3.643 mg.; V=0.615 cc. $N_2$; T=18°; P=740 mm., or 18.29% N; calculated for $C_{13}H_{17}O_8N_5$=18.87% N.

The products above described may be generally characterized by the following structural formula:

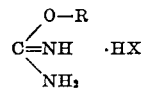

wherein R is a carbocyclic group, such as phenyl, naphthyl, cyclohexyl and homologues thereof, and X is a halogen.

What I claim is:

1. A method which comprises heating a compound taken from the class consisting of phenols, naphthols and cyclohexanols, in an anhydrous medium with a cyanamide hydrohalogenide to form a pseudourea ether.

2. As new products ether hydrochlorides of pseudourea having the following formula:

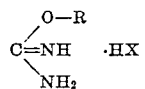

wherein R is a naphthyl, phenyl or cyclohexyl radical, and X is a halogen.

MARTIN BATTEGAY.